H. M. LASHER.
PROCESS OF PRODUCING HYDROCHLORIC ACID FROM SLUDGE.
APPLICATION FILED MAY 9, 1916.
1,309,206.
Patented July 8, 1919.
2 SHEETS—SHEET 2.
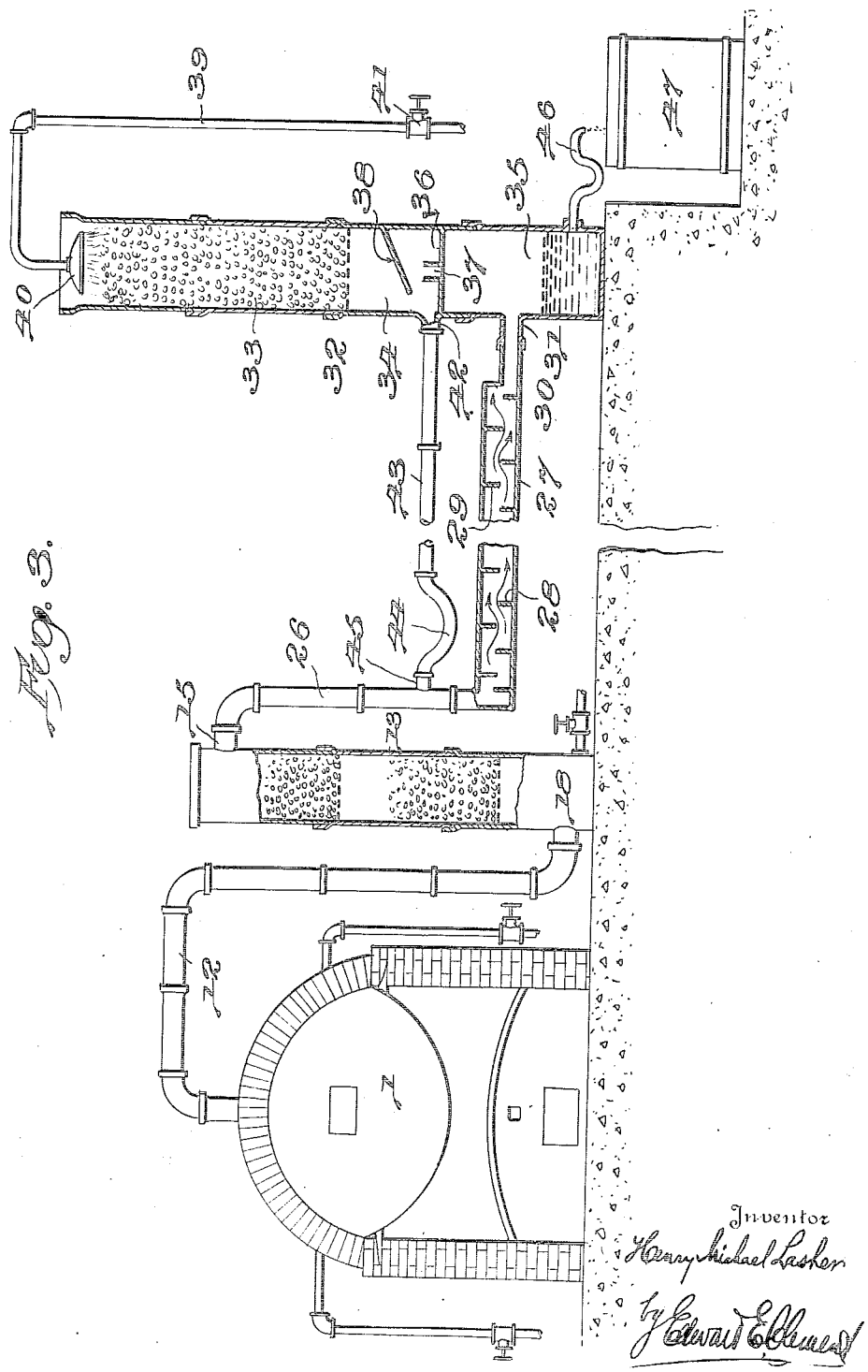

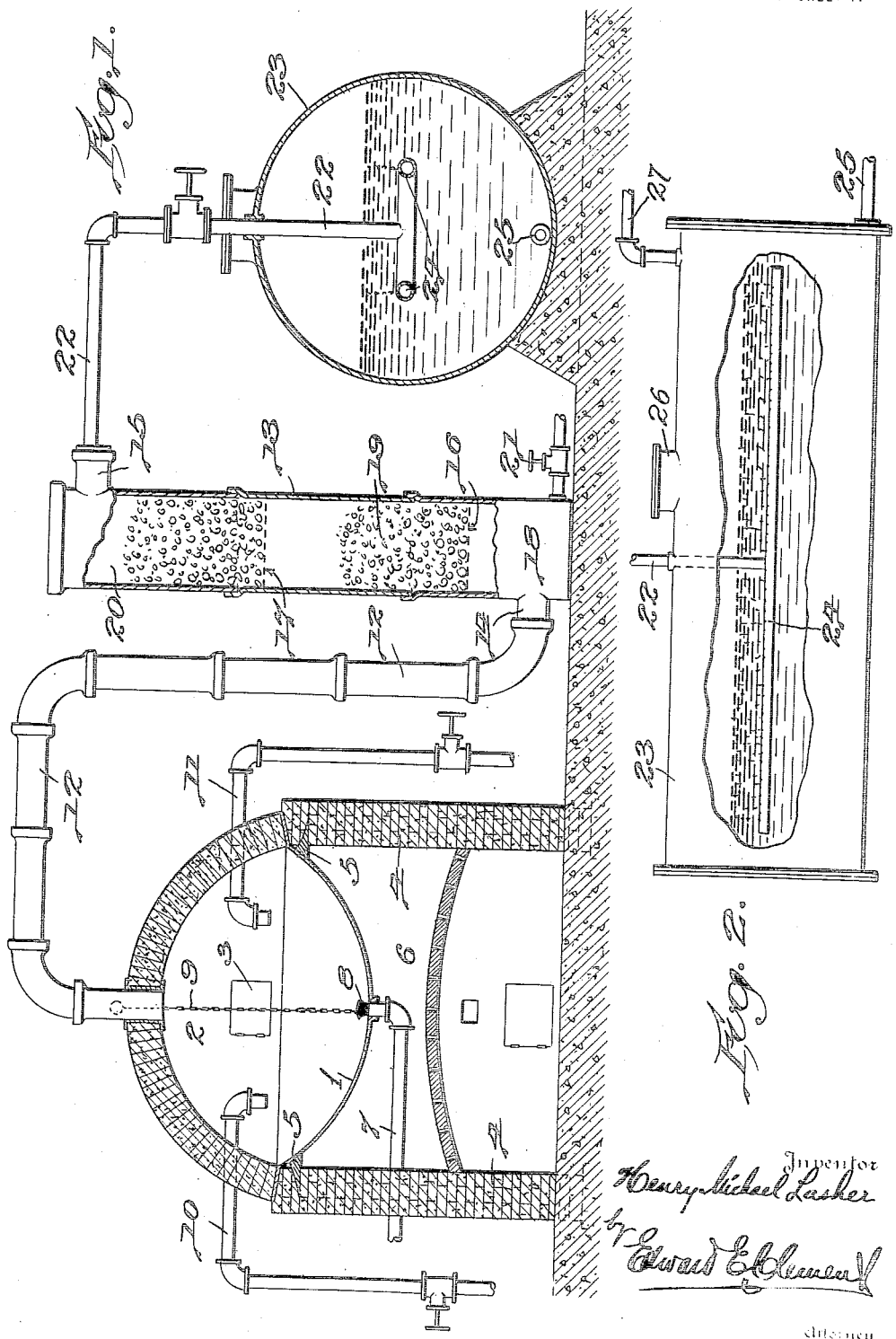

UNITED STATES PATENT OFFICE.

HENRY MICHAEL LASHER, OF KANSAS CITY, KANSAS, ASSIGNOR TO THE KANSAS CITY REFINING COMPANY, OF KANSAS CITY, KANSAS, A CORPORATION OF KANSAS.

PROCESS OF PRODUCING HYDROCHLORIC ACID FROM SLUDGE.

1,309,206.     Specification of Letters Patent.      Patented July 8, 1919.

Application filed May 9, 1916. Serial No. 96,430.

*To all whom it may concern:*

Be it known that I, HENRY M. LASHER, a citizen of the United States of America, residing at Kansas City, in the county of Wyandotte and State of Kansas, have invented certain new and useful Improvements in Processes of Producing Hydrochloric Acid from Sludge, of which the following is a specification, reference being had therein to the accompanying drawing.

My invention relates to the chemical treatment of by-products and especially those resulting from the treatment of hydrocarbon oils and has for its object the production of a process for manufacturing hydrochloric acid and its by-products from the waste product known as sludge acid.

Sludge acid results from the use of sulfuric acid in treating hydrocarbon oils to remove asphalt, tarry matters, sulfur and other undesired compounds, therefrom. These impurities enter into combination and form compounds with the sulfuric acid, so that the latter becomes contaminated or changed to such a degree that heretofore it has been considered a mere waste product, and discarded as unfit for the manufacture of hydrochloric acid and its by-products.

According to my present invention, I mix the sludge acid with sodium chlorid, dilute with enough water to liberate the asphalt and tarry matters, and heat this solution to a low temperature not exceeding 284° C.; I then take the resulting hydrochloric acid gas through a purifying tower, containing sodium chlorid and charcoal, and finally conduct it into a receiving tank containing water in which the gas is absorbed.

In practising my process I employ certain apparatus which I have illustrated in the accompanying drawings in which:

Figure 1 is a diagrammatic sectional view showing the still, the purifying tower and the receiving tank, with their several connected and auxiliary parts forming a complete system;

Fig. 2 is a longitudinal and partly sectional view of the receiving tank, showing the arrangement of the distributing pipe for the incoming gas.

Fig. 3 is a view similar to Fig. 1 showing a modified arrangement of the still and the purifying tower, with a special form of absorber.

I shall first briefly describe the apparatus and then state the operation of the process.

Referring to the drawings, 1 represents a lead lined pan or receptacle, the top of which is closed by an acid proof tile arch 2, closed except for doors 3, used for the purpose of filling the container 1. This combination forms a still, supported upon brick walls 4, as by means of ears 5 in the usual manner, said walls inclosing a furnace 6 by means of which heat may be applied to the pan or receptacle 1. At the bottom of the pan a drain pipe 7 is provided with a plug 8 controlled preferably from above as for example by means of an acid resistant rope or chain 9. This drain pipe is used to draw off the residuum at the end of each run. Entering the still through the sides, and with ends above the pan 1, are two feed pipes 10 and 11, the first of which is used to convey water into the still, and the second to simply convey sludge acid. Each of these pipes is provided with a suitable cut-off valve, and they may be fed from storage tanks or other suitable sources of supply, so as to raise the efficiency of operation, and make it as nearly continuous as possible.

Leading out of the upper part of the still is an acid proof tile pipe 12 through which the gases are conducted to the purifying tower 13. This tower is composed of acid proof tile, with an inlet 14 at the bottom and an outlet 15 at the top. It is divided in any suitable manner as by means of acid resisting screens 16 and 17 into three chambers, 18, 19 and 20. The chamber 18 is vacant, and is provided at the bottom with a drain pipe 21 fitted with a suitable cock. This chamber 18 catches all impurities which are trapped back from the upper purifying chambers 19 and 20. The chamber 19 is packed with lumps of sodium chlorid and has the upper part left clear, so as to make a space between the chambers 19 and 20. This is necessary, in order to prevent impurities which have been taken out by the medium in chamber 19, from being carried up into chamber 20 by means of capillary attraction. Chamber 20 is also preferably provided with a clear upper space, although this depends somewhat upon the arrangement of the outlet 15, the object being to prevent impurities being carried over into the outlet pipe.

From the outlet 15, an acid proof pipe 22 leads through a suitable coupling and connections to the acid or receiving tank 23. The pipe 22 enters this tank from above, and has suspended from it, one or more, preferably a plurality of longitudinal pipes perforated with small holes whose aggregate area is equal to the total area of the pipe 22. The tank 23 is partly filled with water, the quantity of water depending upon conditions, but in any case sufficing to fully cover the pipe system 22—24. The tank is provided with a manhole opening 26 for cleaning purposes, this being fitted with a tight cover, whereby the opening may be completely sealed in operation. The acid proof pipe 25 leaves the lower part of the tank, for drainage purposes, and an iron pipe 27 passes out of the upper portion of the tank for the purpose of conducting away the waste gases.

The steps in my process are as follows: The sludge acid is mixed with sodium chlorid in the proportion of fifty parts by weight of acid to fifty parts by weight of sodium chlorid and this mixture is then diluted with about ten parts by weight of water. In making this mixture in the pan 1, the pipes 10 and 11 are used to introduce the acid and the water respectively and the doors 3 to introduce the sodium chlorid. Heat is then produced in the furnace to raise the temperature of the mixture in the container to a point not exceeding the boiling point of sulfuric acid, that is to say 284° C. The addition of the water to the mixture causes the asphaltum and tarry matters to be liberated and to rise to the surface of the solution and float as a scum thereon. It is necessary that this take place, and that the mixture and heat be as stated because if any considerable portion of the asphalt and tarry matters is left suspended, since these compounds are composed mostly of carbon, and since carbon is a reducing agent, the carbon thus held in suspension would unite chemically with the oxygen in the sulfuric acid and produce free carbon dioxid and sulfur dioxid. The result would be to consume the sulfuric acid without appreciable action upon the sodium chlorid and formation of hydrochloric acid. Heating of the mixture continues, the usual reaction takes place between the sulfuric acid and the sodium chlorid, whereby hydrochloric acid gas is liberated, and passes out of the top or dome of the still through the pipe 12 and into the lowest chamber 18 of the purifying tower 13. As the gas rises and is forced upward, it passes from the lowest chamber 18 into the mass of sodium chlorid lumps resting on the screen 16 in the chamber 19. The heaviest and coarsest impurities, such as asphalt and tar carried over by the rush of gas, are separated immediately, and together with the drainage from the upper chamber, collect in the bottom of the lowest chamber 18 from which they are drained off from time to time through the pipe 21 as the process goes on. In passing upward in succession through the chambers 19 and 20, the acid gas is deprived of the vapors and particles of asphalt, tar and oil which have been carried over with it through the pipe 12, the charcoal which is mingled with the sodium chlorid in the chamber 20 acting as an absorbent of said matters; and the sodium chlorid in both chambers coincidently acting to change any of the sludge carried over, and to complete the reaction and purification initiated in the still.

The acid gas thus purified is carried over from the chamber 20 through the outlet 15 and the pipe 22 into the acid tank 23, where it passes through the pipes 24 and is distributed to all the little openings in said pipes, through which it escapes and is absorbed into the water which covers them. The process is continued until a solution of any desired strength is produced, and this may be concentrated thereafter, or pure acid obtained therefrom, in any known manner. The solution is finally drained off from the tank 23 through the pipe 25.

The residuum left in the pan 1 by this process consists of a solution of sodium sulfate with a floating scum, which scum is largely composed of asphalt, tarry and fatty matters. The sodium sulfate solution is drawn out of the bottom of the receptacle 1, after which it may be concentrated by evaporation. After the sodium sulfate has been thus extracted, the scum component is drawn off, if necessary by washing out, through the pipe 7. It may be treated for the recovery of the several constituents of which it is composed, if desired, or may be used with or without further purifying, for road binding material, or otherwise. While this is purely a by-product, it has some value, and as its recovery is incidental to the performance of my whole process, I consider it a part of my invention.

I am aware that it has been proposed among refiners to reclaim sludge acid into sulfuric acid but this is an expensive and troublesome process, and so far as I know, up to this time has not been regarded as successful, presumably for that reason. My own experiments have convinced me that the reclamation of the sulfuric acid as such is not the best or most profitable method of disposing of the sludge, an approximate analysis of which (allowing for some variation) after having been used for treating gasolene, kerosene and distillates, would be as follows:

Sp. gr. 1.635 (Baumé 56°)
Sulfuric acid, 76.4%
Asphalt and carbon ⎫
Sulfur compounds ⎬ 23%
Sulfonic acid, trace.

In Fig. 3, the still and the purifying tower 13 are substantially the same as in Fig. 1, but from the outlet 15 of the tower, the absorbing apparatus is different. This latter consists of a vertical pipe 26 connected at its lower end to the absorber 27 which is fitted with baffle plates or partitions 28 and 29 extending alternately from the bottom and the top, and so related to each other that liquid flowing through the absorber will be forced to pass up and down between the baffles, and gas flowing through the same compartments will follow the same course and thereby will be brought into intimate contact with the water and be forced therethrough, so as to be absorbed thereby. The discharge end 30 of the absorber 27 is connected to inlet 31 to an absorbing tower 32 divided into three compartments, the upper one 33 being filled with small pieces of acid-proof earthenware, the middle one 34 being a gas and water chamber or separator, and the lower one 35 a receiving chamber for the concentrated acid solution. Chambers 34 and 35 are separated by a plate 36 having a central opening 37 with a high flange surrounding it, to prevent drainage of water from chamber 34 into chamber 35, while permitting the free passage of gas upwardly from chamber 35 into chamber 34. Water is introduced through a pipe 39 and a spray 40 controlled by the valve 41, into the top of the chamber 33, through which it trickles down over the surfaces of the pieces of earthenware until it reaches the chamber 34, being exposed over a very large superficial area, while flowing, to the action of the acid gas rising through the chamber. On reaching the chamber 34, the liquid which by that time is already a dilute acid, is prevented from reaching the opening 37 by the baffle plate 38, which sheds all the liquid over toward an outlet 42 of the chamber 34. From this outlet an acid proof pipe 43 leads across through a U-trap 44 to an inlet 45 in the down pipe 26.

The operation of this modified form of apparatus is as follows: After being purified in the tower 13, the acid fumes pass down into the pipe 26 and being prevented from passing through the pipe 43 by the liquid filled trap 44, are forced to traverse the absorber 27, as indicated by the upper line of arrows therein. Liquid is simultaneously circulated through this absorber, its superior gravity causing it to flow along the bottom as indicated by the lower line of arrows. The baffles 28 and 29 force the gas into intimate contact with the water, thereby producing a very high percentage of absorption by the time the mixed gas and water reach the outlet 30 of the absorber. The gas passes upwardly through the opening 37, and around the inclined baffle plate 38 and finally rises through the mass of earthenware 33 and is further absorbed by the incoming water from the spray 40. What is left of the gas after passing the spray may escape or may be received and retained in any appropriate manner if desired.

The water from the spray 40 passes down through the earthenware into the chamber 34 through the pipe 43 and trap 44 into the inlet 45 and so down through the pipe 26 into the absorber and back to the chamber 35 from which as concentrated acid it is drawn off through the pipe 46 into the final receiving tank 47.

Obviously this process may be practised with other apparatus than that specifically described herein, and some variations may be made in the steps of the process or additional steps included, without departing from the scope of my invention. It is to be understood that I contemplate all such non-essential changes and modifications as fall fairly within the scope of the appended claims.

Having thus described my invention what I claim and desire to secure by Letters Patent is:

1. The process of utilizing sludge acid which consists in the following steps: (1) Mixing sludge acid with sodium chlorid and diluting the mixture with water; (2) heating the mixture continuously to a temperature not exceeding that at which sulfuric acid boils and sufficient to produce a suitable reaction between the sludge acid and the sodium chlorid; (3) drawing off the acid vapors until a non-acid residuum is left; (4) drawing off and conserving the residuum; and (5) refining said residuum by treatment to remove undesirable compounds.

2. The process of producing hydrochloric acid from sludge sulfuric acid which consists in the following steps: (1) Mixing the sludge with sodium chlorid and diluting with water; (2) heating the mixture to a temperature not exceeding 284° C. and sufficient to produce a suitable reaction between the sludge acid and the sodium chlorid so as to liberate the asphalt and tarry constituents; (3) continuing the heating to distil off hydrochloric acid gas; (4) conducting said gas through a mass of sodium chlorid; and (5) conveying the purified gas into a tank or receiver containing water for absorption thereby.

3. The process of producing hydrochloric acid from sludge sulfuric acid which consists in the following steps: (1) Mixing the sludge with sodium chlorid and diluting with water; (2) heating the mixture to a temperature not exceeding 284° C. and sufficient to produce a suitable reaction between the sludge acid and the sodium chlorid so as to liberate the asphalt and tarry constituents; (3) continuing the heating to distil off hydrochloric acid gas; (4) carrying the said gas through a mass of sodium chlorid and charcoal; and (5) conveying the gas thus purified into a tank or receiver contaning water and causing it to be absorbed by said water to produce a solution of hydrochloric acid.

In testimony whereof I affix my signature.

HENRY MICHAEL LASHER.